United States Patent
Ibrahim et al.

(10) Patent No.: US 12,261,723 B2
(45) Date of Patent: Mar. 25, 2025

(54) DETECTOR FOR FASTER THAN NYQUIST TRANSMITTED DATA SYMBOLS

(71) Applicant: CARLETON UNIVERSITY, Ottawa (CA)

(72) Inventors: Ahmed Mohamed Ali Ibrahim, Ottawa (CA); Ebrahim Bedeer, Saskatoon (CA); Halim Yanikomeroglu, Ottawa (CA)

(73) Assignees: CARLETON UNIVERSITY, Ontario (CA); UNIVERSITY OF SASKATCHEWAN, SASKATOON, Saskatchewan (CA)

( * ) Notice: Subject to any disclaimer, the term of this patent is extended or adjusted under 35 U.S.C. 154(b) by 0 days.

(21) Appl. No.: 18/277,449

(22) PCT Filed: Feb. 16, 2022

(86) PCT No.: PCT/IB2022/051391
§ 371 (c)(1),
(2) Date: Aug. 16, 2023

(87) PCT Pub. No.: WO2022/175846
PCT Pub. Date: Aug. 25, 2022

(65) Prior Publication Data
US 2024/0305506 A1      Sep. 12, 2024

Related U.S. Application Data

(60) Provisional application No. 63/150,798, filed on Feb. 18, 2021.

(51) Int. Cl.
*H04L 25/03*      (2006.01)
(52) U.S. Cl.
CPC .............................. *H04L 25/03178* (2013.01)

(58) Field of Classification Search
CPC .................... H04L 25/03178; H04L 25/03184
See application file for complete search history.

(56) References Cited

U.S. PATENT DOCUMENTS 10,116,331 B2 * 10/2018 Kim ..................... H04L 1/0042
11,108,447 B2 * 8/2021 Alodeh ............ H04L 25/03834
(Continued)

OTHER PUBLICATIONS

Shi, Qiaolin, et al. "Frequency-domain joint channel estimation and decoding for faster-than-Nyquist signaling." IEEE Transactions on Communications 66.2 (2017): 781-795.
(Continued)

*Primary Examiner* — Dac V Ha
(74) *Attorney, Agent, or Firm* — PERRY + CURRIER, INC.

(57) ABSTRACT

Systems and methods relating to estimating data symbols encoded in a received signal that has been transmitted at a faster than Nyquist rate. The present invention uses a heuristic method for non-convex problems and involves an input matrix and received samples from the received signal. These are preconditioned and the preconditioned input matrix is factorized. The method then iterates a three-step process that estimates the sequence of data symbols based on the current estimate, the preconditioned input matrix, the preconditioned samples vector, a multiplier vector, and an auxiliary vector. The process then calculates the next multiplier vector and the next auxiliary vector. If the result indicates a minimum as compared to the best estimate, then the result is used as the best estimate. Multiple iterations of the process are performed, and the multiple iterations are repeated for multiple random initializations of the estimate.

20 Claims, 2 Drawing Sheets

(56) References Cited

U.S. PATENT DOCUMENTS

| | | | |
|---|---|---|---|
| 2015/0311973 A1 | 10/2015 | Colavolpe et al. | |
| 2018/0076861 A1* | 3/2018 | Gattami | H04L 25/0384 |
| 2023/0308143 A1* | 9/2023 | Yuan | H04B 7/0413 |

OTHER PUBLICATIONS

Nyquist, Harry. "Certain topics in telegraph transmission theory." Transactions of the American Institute of Electrical Engineers 47.2 (1928): 617-644.

Onural, Levent, et al. "A survey of signal processing problems and tools in holographic three-dimensional television." IEEE Transactions on Circuits and Systems for Video Technology 17.11 (2007): 1631-1646.

Prija, Adnan et al., "Reduced-complexity receivers for strongly narrowband intersymbol interference introduced by faster-than-Nyquist signaling." IEEE Transactions on Communications 60.9 (2012): 2591-2601.

Prlja, Adnan et al. "Receivers for faster-than-Nyquist signaling with and without turbo equalization." 2008 IEEE International Symposium on Information Theory. IEEE, 2008.

Rashich, Andrey et al. "ZF equalizer and trellis demodulator receiver for SEFDM in fading channels." 2019 26th international conference on telecommunications (ICT). IEEE, 2019.

Rusek, Fredrik et al. "The two dimensional Mazo limit." Proceedings. International Symposium on Information Theory, 2005. ISIT 2005 . . . IEEE, 2005.

Rusek, Fredrik et al. "Non binary and precoded faster than Nyquist signaling." IEEE Transactions on Communications 56.5 (2008): 808-817.

Rusek, Fredrik et al. "Multistream faster than Nyquist signaling." IEEE Transactions on Communications 57.5 (2009): 1329-1340.

Akyildiz, Ian F. et al. "Combating the distance problem in the millimeter wave and terahertz frequency bands." IEEE Communications Magazine 56.6 (2018): 102-108.

Anderson, John B et al. "New reduced state space BCJR algorithms for the ISI channel." 2009 IEEE International Symposium on Information Theory. IEEE, 2009.

Anderson, John B. et al. "Faster-than-Nyquist signaling." Proceedings of the IEEE 101.8 (2013): 1817-1830.

Barbieri, Alan et al. "Time-frequency packing for linear modulations: spectral efficiency and practical detection schemes." IEEE Transactions on Communications 57.10 (2009): 2951-2959.

Bedeer, Ebrahim et al. "Low-complexity detection of high-order QAM faster-than-Nyquist signaling." IEEE Access 5 (2017): 14579-14588.

Bedeer, Ebrahim et al. "Low-complexity detection of M-ary PSK faster-than-Nyquist signaling." 2019 IEEE Wireless Communications and Networking Conference Workshop (WCNCW). IEEE, 2019.

Bedeer, Ebrahim et al. "Reduced complexity optimal detection of binary faster-than-Nyquist signaling." 2017 IEEE International Conference on Communications (ICC). IEEE, 2017.

Bedeer, Ebrahim et al. "A very low complexity successive symbol-by-symbol sequence estimator for faster-than-Nyquist signaling." IEEE Access 5 (2017): 7414-7422.

Berscheid, Brian et al. "Full duplex DOCSIS: Opportunities and challenges." IEEE Communications Magazine 57.8 (2019): 28-33.

Caglan, Abdulsamet, et al. "Polar coded faster-than-Nyquist (FTN) signaling with symbol-by-symbol detection." 2020 IEEE Wireless Communications and Networking Conference (WCNC). IEEE, 2020.

Hochwald, B. M. and S. Ten Brink, "Achieving near-capacity on a multiple-antenna channel," IEEE Transactions on Communications, vol. 51, No. 3, pp. 389-399, Mar. 2003.

Wang, Cheng-Kun and Lin-Shan Lee, "Practically realizable digital transmission significantly below the Nyquist bandwidth," IEEE Transactions on Communications, vol. 43, No. 2/3/4, pp. 166-169, Feb./Mar./Apr. 1995.

Rusek, F., "On the existence of the Mazo-limit on MIMO channels," IEEE Transactions on Wireless Communications, vol. 8, No. 3, pp. 1118-1121, Mar. 2009.

Hasse P. et al., "DVB-C2—a standard for improved robustness in cable networks," in Proceedings of the IEEE International Symposium on Consumer Electronics (ISCE 2010), 2010, pp. 1-6.

Sugiura, S., "Frequency-domain equalization of faster-than-Nyquist signaling," IEEE Wireless Communications Letters, vol. 2, No. 5, pp. 555-558, Oct. 2013.

Ishihara, T. and S. Sugiura, "Frequency-domain equalization aided iterative detection of faster-than-Nyquist signaling with noise whitening," in Proceedings of the IEEE International Conference on Communications (ICC), 2016, pp. 1-6.

Fan J., Y. Ren, Y. Zhang, and X. Luo, "Iterative carrier frequency offset estimation for faster-than-Nyquist signaling," in Proceedings of the IEEE International Symposium on Wireless Personal Multimedia Communications (WPMC), 2017, pp. 150-153.

Han, C. and Y. Chen, "Propagation modeling for wireless communications in the terahertz band," IEEE Communications Magazine, vol. 56, No. 6, pp. 96-101, Jun. 2018.

Song, P., F. Gong, and Q. Li, "Blind symbol packing ratio estimation for faster-than-Nyquist signalling based on deep learning," Electronics Letters, vol. 55, No. 21, pp. 1155-1157, Oct. 2019.

Clemm, A., M. T. Vega, H. K. Ravuri, T. Wauters, and F. D. Turck, "Toward truly immersive holographic-type communication: Challenges and solutions," IEEE Communications Magazine, vol. 58, No. 1, pp. 93-99, Jan. 2020.

Yuan, W. et al., "Iterative joint channel estimation, user activity tracking, and data detection for FTN-NOMA systems supporting random access," IEEE Transactions on Communications, vol. 68, No. 5, pp. 2963-2977, May 2020.

Li, Q. et al., "Joint channel estimation and precoding for faster-than-Nyquist signaling," IEEE Transactions on Vehicular Technology, pp. 1-1, Sep. 2020.

Racom. Racom products: Ray-microwave link. Last accessed Oct. 11, 2020. [Online]. Available: https://www.racom.eu/eng/products/microwave-link.html =0pt.

Kulhandjian, M. et al., "Low-complexity detection for faster-than-Nyquist signaling based on probabilistic data association," IEEE Communications Letters, vol. 24, No. 4, pp. 762-766, Apr. 2020.

Liveris, A. D. and C. N. Georghiades, "Exploiting faster-than-Nyquist signaling," IEEE Transactions on Communications, vol. 51, No. 9, pp. 1502-1511, Sep. 2003.

Luo, Z.-Q. and P. TSENG, "On the convergence rate of dual ascent methods for linearly constrained convex minimization," Mathematics of Operations Research, vol. 18, No. 4, pp. 846-867, Nov. 1993.

Mazo, J. E. "Faster-than-nyquist signaling," The Bell System Technical Journal, vol. 54, No. 8, pp. 1451-1462, Oct. 1975.

Takapoui, R. et al., "A simple effective heuristic for embedded mixed-integer quadratic programming," International Journal of Control, vol. 93, No. 1, pp. 2-12, Apr. 2017.

Boyd S., N. Parikh, E. Chu, B. Peleato, and J. Eckstein, "Distributed optimization and statistical learning via the alternating direction method of multipliers," Foundations and Trends in Machine Learning, vol. 3, No. 1, pp. 1-122, 2011.

ITU-R, "Minimum requirements related to technical performance for IMT-2020 radio interface(s)," Nov. 2017.

ISA/IB, International Search Report and Written Opinion, Apr. 26, 2022, issued in corresponding International Patent Application No. PCT/IB/2022/051391.

Johnson, D. H., "Statistical signal processing," Lecture Notes, 2013, last accessed on Oct. 11, 2020. [Online]. Formerly Available: http://cnx.org/content/col11382/1.1/.Lecturenotes; Currently available: https://www.ece.rice.edu/~dhj/courses/elec531/notes.pdf.

PCT/IB2022/051391, Detector for Faster Than Nyquist Transmitted Data Symbols, filed Feb. 16, 2022.

* cited by examiner

Input: Pulse shape $p(t)$, ISI matrix G or a causal ISI matrix V, received samples $y$, $\mathcal{D}$, number of iterations $L$, and number of initializations $\kappa$.

Initialization:

1) Pre-condition $\tilde{G}$ and $q$ (which is derived from $y$) by dividing all elements by the largest singular value of $\tilde{G}$.
2) Perform the $LDL^T$ factorization of the conditioned $\tilde{G}$.
3) $\tilde{a}_{best} := \emptyset$ and $f(\tilde{a}_{best}) := \infty$.

Execute:

for Random initialization $1, 2, \ldots, K$ do
    for Iteration $1, 2, \ldots, L$ do
        Update $\tilde{a}$ based on Eqns. 25-27
        if $f(\tilde{a}) < f(\tilde{a}_{best})$ then
            $(\tilde{a}_{best}) := \tilde{a}$
        end if
    end for
end for
return $\tilde{a}_{best}$

FIG. 2

DETECTOR FOR FASTER THAN NYQUIST TRANSMITTED DATA SYMBOLS

TECHNICAL FIELD

The present invention relates to decoding encoded data symbols used in a communications channel. More specifically, the present invention relates to systems and methods for decoding data symbols in a received signal that was transmitted at a faster than Nyquist rate.

BACKGROUND 6G wireless communication systems are expected to support novel use cases that are mainly driven by the ongoing and rapid changes in our societies and their impact in our lifestyle. While such changes are due to many contributing reasons, currently we witness the widespread of the COVID-19 pandemic that has certainly affected many aspects of our life and we relied more than ever on technology and video conferencing to support economy, online education, services, etc., which increases the demands on higher throughput. While the ongoing deployment of 5G wireless communication systems can support enhanced multimedia applications of peak rates of 20 Gbps [33], it is expected that such applications will evolve to augmented reality, 3DTV/holographic communications, and multi-sense communications, and/or their combinations. The evolved applications are expected to require peak rates in the order of a few terabits per second (Tbps) which is beyond the capability of 5G systems [20, 34]. To support such requirements, there is a need for larger bandwidths (up to 1 THz) than what is currently offered in 5G. However, such new frequency bands suffer from very high absorption [15] and may be suitable only for short (few meters) range 6G communication applications. Even the spectrum windows with low absorption and better propagation conditions will not be fully available for 6G communications as they are already allocated by the ITU (International Telecommunications Union) to other services such as astronomy and earth exploration communications [16]. That said, some 6G applications will still be offered over the existing 4G/5G frequency bands and there is a need for innovative solutions to improve the spectral efficiency (SE) given the limited bandwidth.

Improving the SE is arguably the oldest problem in PHY from 1920s (predating Shannon) and gains of fractions of dB in signal-to-noise ratio (SNR) to maintain the same SE are of high value. Faster-than-Nyquist (FTN) signaling is a promising physical layer transmission technique for increasing the SE of next generation communication systems when compared to classical Nyquist signaling [25]. More specifically, Nyquist showed that signaling at rates greater than 1/T of T-orthogonal pulses, i.e., pulses that are orthogonal to an nT shift of themselves for nonzero integer n, results in ISI at the samples of receiver's matched filter output [40]. The basic idea of FTN signaling is to transmit the time domain pulses with a rate that exceeds the Nyquist limit, which intentionally creates inter-symbol interference (ISI) at the receiver side. The prominent work of J. E. Mazo in 1975 [39] was the first to prove that FTN signaling does not affect the minimum distance of binary sinc pulse when transmitted at rate $1/\tau$, $\tau \in [0.802,1]$, higher than the Nyquist signalling—this is called the Mazo limit. In other words, Mazo proved that almost 25% more bits, compared to Nyquist signaling, can be transmitted in the same bandwidth and at the same SNR without degrading the bit error rate (BER) (assuming optimal detection at the receiver). The potential of FTN signaling extends beyond the Mazo limit in practical coded communications systems, where it was shown that substantial acceleration of the transmit pulses increases the constrained capacity, if the complexity bottleneck can be sorted out [25]. This translates to profound returns at the cost of some mild performance loss.

There are a number of communications technologies and standards that adopts ultra high-order QAM and for which additional SE gains can be achieved by using FTN signaling. These systems include high speed point-to-point microwave links such as RAy3 (the third generation of RAy) and digital video broadcasting DVB-C2 that use QAM modulation orders up to 4096 [10, 24], as well as the broadband cable based internet DOCSIS 3.1 standard that uses QAM modulation orders up to 16,384 (16K)[18].

One method for high-order QAM FTN signaling detection is the GASDRSE proposed in [26] and is based on the semi-definite relaxation algorithm. The GASDRSE algorithm showed excellent performance and SE gains for modulation orders up to 16-QAM. However for modulation orders larger than 16, the algorithm was found to fail, besides requiring an impractically large computational time.

The spectral efficiency (SE in bits/sec/Hz) is the number of information bits carried per a given time and bandwidth, and it can be increased by increasing the transmission power (in addition to independently increasing the transmission bandwidth) to support high-order modulation. FTN signaling can be seen as an alternative or a complement to high-order modulation to further improve the SE. Surprisingly, a very similar concept is now the driving force behind holographic communication where researchers showed that for space-limited holographic signals it is possible to perfectly reconstruct holographic objects from their (significantly) below Nyquist rate samples [3]. This shows the potential of improving the performance of communications systems by accepting interference in other applications and domains.

After Mazo's work, the concept of the Mazo limit has been extended to different domains, i.e., other pulse shapes [37], high-order (up to 8-ary) pulse amplitude modulation [2, 4], and MIMO (multiple input multiple output) systems [6], to name a few extensions. Most importantly, the concept of the Mazo limit has been extended to the frequency domain where the spacing between the subcarriers of orthogonal frequency division multiplexing (OFDM) transmission is packed beyond the orthogonal condition and up to a certain limit. Such frequency packing results in intentional inter-carrier interference (ICI) while maintaining the same minimum Euclidean distance, and hence, the error rate of OFDM transmission [41]. This can be useful as long as there are proper detection techniques at the receiver to remove the ICI. Such non-OFDM transmission is usually called multi-stream FTN signaling [7] or time-frequency packing [9] and is considered a promising candidate waveform for next-generation communications systems. The importance of extending the concept of the Mazo limit to the frequency domain is because independent SE gains can be obtained from time-domain pulse acceleration and from frequency-domain subcarrier packing.

The optimal detection algorithms of the FTN signaling that minimize the error rate in the presence of ISI and/or ICI are, in general, complex [25]. Following [25], we define three orders of detector complexity: simple, trellis, and iterative, depending on the severity of the interference and how much processing power is available at the receiver for a given application. Simple detection can be in the form of simple equalization techniques to remove the ISI/ICI such as the works in [12, 13, 22, 28], where acceptable error rate performance is reported for light ISI scenarios, i.e., at values of time acceleration parameters around 0.9 or 0.8. To achieve moderate SE gains with reasonable detection complexity, nonlinear FTN signaling detection algorithms based on semi-definite relaxation were proposed in [26] and [29] for high-order quadrature-amplitude modulation (QAM) and phase shift keying (PSK) modulations, respectively, with polynomial time complexity. As the ISI length grows, simple detectors fail to give satisfactory error rate performance and more involved detectors are required. The ISI generated from FTN signaling has a trellis structure [37] and techniques such as standard Viterbi algorithm (VA) or Bahl-Cocke-Jelinek-Raviv (BCJR) algorithm can be used to detect the most likely transmit sequence or to find the likelihood of individual bits, respectively, for moderate levels of ISI/ICI [8, 37]. Iterative detection or turbo equalization is useful when the trellis size becomes large in severe ISI scenarios [25]. In such cases, standard VA or BCJR become impractical to implement and either reduced trellis or reduced search variants of the VA or BCJR are used [5, 8]. The main idea is to either search a part of the whole trellis (reduced search); or to perform full search only over a smaller trellis size (reduced trellis). Such iterative techniques showed good performance for coded FTN signaling systems [11].

Various other specific aspects of the FTN signaling technology have been recently under active research. In [17] a zero-forcing one tap equalizer and trellis demodulator of non-orthogonal multicarrier FTN signaling over LTE fading channels is studied. Joint FTN signaling detection, channel estimation, and user-activity tracking is investigated for an FTN-NOMA system relying on random access to support massive connectivity and high throughput in machine-type communications in dynamically fluctuating environments [21]. In [23], FTN signaling over frequency-selective fading channels is considered for which a joint channel estimation and precoding algorithm is proposed to perform data detection for FTN signaling. In comparison to the existing frequency-domain channel estimation and equalization algorithms, the algorithm in [23] greatly reduces the complexity of signal processing at receivers since it performs the linear precoding processing at transmitters. In [19], to avoid the need for a dedicated channel for control frames, a deep neural network architecture was proposed to estimate the adaptive time acceleration parameter. The estimation accuracy reached 99% for acceleration parameters in the range of 0.6 to 1.

Another important design problem in FTN signaling is synchronization. Due to the inherent ISI in the transmitted FTN signal, traditional synchronization methods become unsuitable and inaccurate making the carrier synchronization of FTN systems more involved. To overcome this issue, an iterative carrier frequency offset estimation scheme for an FTN signaling system is proposed in [14]. The scheme consists of a coarse estimation step based on discrete Fourier transform and a fine estimation step based on a golden-section search algorithm.

From the above, it should be clear that novel methods and systems that address the above issues are needed. Such solutions would, preferably, provide suitable results without the need for undue processing resources or lengthy processing times.

SUMMARY

The present invention provides systems and methods relating to estimating data symbols encoded in a received signal that has been transmitted at a faster than Nyquist rate. The present invention uses a heuristic method for non-convex problems and involves an input matrix and received samples from the received signal. These are preconditioned and the preconditioned input matrix is factorized. The method then iterates a three-step process that estimates the sequence of data symbols based on the current estimate, the preconditioned input matrix, the preconditioned samples vector, a multiplier vector, and an auxiliary vector. The process then calculates the next multiplier vector and the next auxiliary vector. If the result indicates a minimum as compared to the best estimate, then the result is used as the best estimate. Multiple iterations of the process are performed, and the multiple iterations are repeated for multiple random initializations of the estimate.

In a first aspect, the present invention provides a data processor block for use in a data receiver system, the data processor block comprising:

a data processor for processing a received signal, said received signal being received by said data receiver system, said data processor being for estimating a sequence of data symbols in said received signal, said symbols having been transmitted at a rate faster than a Nyquist rate;

wherein said data processor implements a method comprising:

a) receiving an input matrix, a received samples vector, received samples in said received samples vector being from said received signal;
b) preconditioning said input matrix and said received samples vector to result in a prepared input matrix and a prepared received samples vector;
c) performing a factorization of prepared input matrix;
d) initializing a best estimate vector;
e) initializing a current estimate vector, a current multipliers vector, and a current auxiliary vector;
f) executing steps f1)-f4);
g) repeating step f) for a predetermined number of iterations;
h) repeating steps e)-g) for a predetermined number of initializations;
i) outputting said best estimate vector as said estimate for said sequence of data symbols;

wherein steps f1)-f4) comprise:

f1) calculating a next estimate vector for said sequence of data symbols based on said prepared input matrix, said prepared received samples vector, a current estimate vector, a current multipliers vector, and a current auxiliary vector,
f2) calculating a next auxiliary vector based on said next estimate vector and said current multipliers vector;
f3) calculating a next multipliers vector based on said current multipliers vector, said next estimate vector, and said next auxiliary vector;
f4) assessing a calculated current function value using said current estimate vector and comparing said calculated current function value with a result of assessing a best estimate function value and, if said calculated current function value is less than said result of assessing said best estimate function value, storing said current estimate vector as said best estimate vector.

In a second aspect, the present invention provides a method for estimating a sequence of data symbols in a received signal, the method comprising:

a) receiving said received signal;
b) receiving an input matrix and a received samples vector, received samples in said received samples vector being from said received signal;

c) preconditioning said input matrix and said received samples vector to result in a prepared input matrix and a prepared received samples vector;
d) performing a factorization of prepared input matrix;
e) initializing a best estimate vector;
f) initializing a current estimate vector, a current multipliers vector, and a current auxiliary vector;
g) executing steps g1)-g4);
h) repeating step g) for a predetermined number of iterations;
i) repeating steps g)-h) a predetermined number of initializations;
j) outputting said best estimate vector as said estimate for said sequence of data symbols;
wherein said symbols having been transmitted at a rate faster than a Nyquist rate; and
wherein steps g1)-g4) comprises:
  g1) calculating a next estimate vector for said sequence of data symbols based on said prepared input matrix, said prepared received samples vector (q), a current estimate vector, a current multipliers vector, and a current auxiliary vector;
  g2) calculating a next auxiliary vector based on said next estimate vector and said current multipliers vector;
  g3) calculating a next multipliers vector based on said current multipliers vector, said next estimate vector, and said next auxiliary vector;
  g4) assessing an estimated result to determine if said estimate result indicates a minimum as compared to an assessment of said best estimate vector and, if said estimated result indicates said minimum, then replacing said best estimate vector with said estimated current estimate vector.

As a further aspect, the present invention provides a data processor block for use in a data receiver system, the data processor block comprising:
  a data processor for estimating a sequence of data symbols in a received signal, said symbols having been transmitted at a rate faster than a Nyquist rate;
wherein said data processor implements a method comprising:
a) receiving an input matrix, a received samples vector, received samples in said received samples vector being from said received signal;
b) executing steps (b1)-(b4);
c) repeating step b) for a predetermined number of iterations;
d) outputting a best estimate vector from iterations of steps (b1)-(b4) as said estimate for said sequence of data symbols;
wherein steps (b1)-(b4) comprises:
  b1) calculating a next estimate vector for said sequence of data symbols based on said input matrix, said received samples vector, a current estimate vector, a current multipliers vector, and a current auxiliary vector,
  b2) calculating a next auxiliary vector based on said next estimate vector and said current multipliers vector;
  b3) calculating a next multipliers vector based on said current multipliers vector, said next estimate vector, and said next auxiliary vector;
  b4) assessing a calculated current function value using said current estimate vector and comparing said calculated current function value with a result of assessing a best estimate function value and, if said calculated current function value is less than said result of assessing said best estimate function value, storing said current estimate vector as said best estimate vector.

In another aspect, the steps of the process according to the present invention involves calculating $$\tilde{a}^{k+1} := \arg\min_{\tilde{a}} \left( f(\tilde{a}) = \tilde{a}^\top \tilde{G} \tilde{a} + q^\top \tilde{a} + r + \frac{\rho}{2} \|\tilde{a} - x^k + \mu^k\|_2^2 \right);$$

$$x^{k+1} := \Xi(\tilde{a}^{k+1} + u^k);$$

and $$\mu^{k+1} := u^k + \tilde{a}^{k+1} - x^{k+1};$$

where $\mu^k$ is said current multipliers vector, $\tilde{a}^{k+1}$ is said next estimate vector, $x^{k+1}$ is said next auxiliary vector, $\mu^{k+1}$ is said next multipliers vector, $x^{k+1}$ is said next auxiliary vector, $\tilde{a}$ is said estimate vector, q is said prepared received samples vector, $\tilde{G}$ is said prepared input matrix, $x^k$ is said current auxiliary vector, $\rho$ is a scalar and wherein, for any finite set $\mathcal{D}_i$ with m elements, $\Xi_i(x_i)$ is a closest point to $x_i$ that belongs to $\mathcal{D}_i$ which can be found by $\lceil \log_2 m \rceil$ comparisons.

BRIEF DESCRIPTION OF THE DRAWINGS

The embodiments of the present invention will now be described by reference to the following figures, in which identical reference numerals in different figures indicate identical elements and in which:
FIG. 2 details a method according to one aspect of the present invention for calculating best estimates for the data symbols in a received signal.

DETAILED DESCRIPTION

Figure 1:
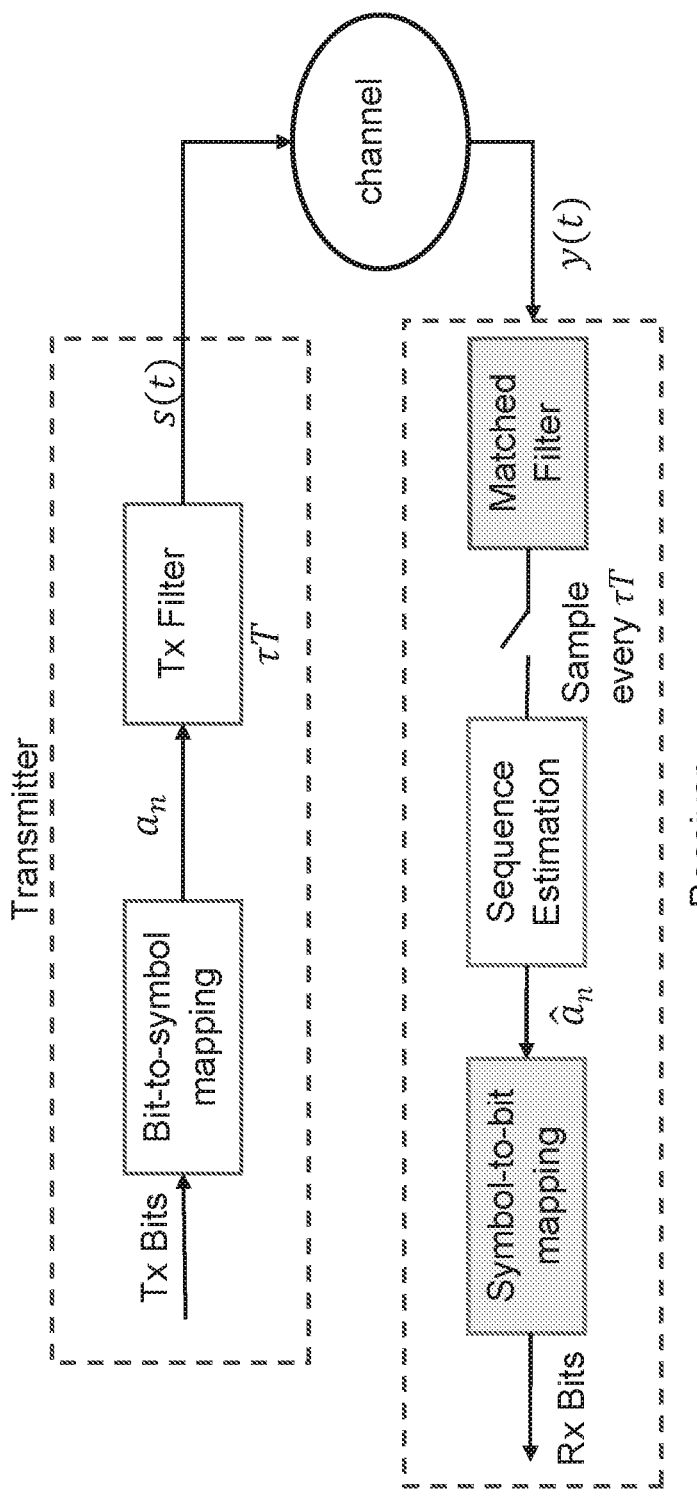
FIG. 1 is a block diagram of a possible transmitter-receiver structure for a single carrier FTN system.

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

In one aspect, the present invention relates to a low complexity polynomial time detection scheme that stems from operations research and has been termed as the alternating directions multiplier method (ADMM). The inventive detection method demonstrates a very favorable combination of computational efficiency and performance that provides a practical enablement for the detection of ultra high-order QAM modulation.

The present invention addresses the detection problem of ultra high-order quadrature-amplitude modulation (QAM) FTN signalling. In one aspect, the present invention takes advantage of a mathematical programming technique based on the alternating directions multiplier method (ADMM). The inventive ADMM sequence estimation (ADMMSE) FTN signaling detector according to one aspect of the present invention has shown an excellent trade-off between performance and computational effort enabling successful detection and SE gains for modulation orders as high as 64K (65,536)-QAM. The complexity of the inventive ADMMSE system and method is polynomial in the length of the transmit symbols sequence and its sensitivity to the modulation order increases logarithmically. Simulation results show that for 16-QAM, the inventive ADMMSE FTN signaling detector achieves comparable SE gains to the GASDRSE FTN signaling detector, but at a much lower computational time. Simulation results additionally show SE gains for modulation orders starting from 4-QAM, or quadrature phase shift keying (QPSK), up to and including 64K-QAM when compared to conventional Nyquist signaling. The very low computational effort required to implement this aspect of the present invention makes the inventive ADMMSE detector a practical FTN signaling detector for both low order and ultra high-order QAM FTN signaling systems.

FIG. 1 illustrates the block diagram of a possible transmitter and receiver structure of a single carrier FTN system. At the transmitter, the data bits to be transmitted are gray mapped to symbols at the bits-to-symbols mapping block. These data symbols are then transmitted through the transmit pulse shaping filter at a pulse rate faster than Nyquist's, i.e., at $$R_S = \frac{1}{\tau T}, \tag{1}$$

where $R_s$ is the pulse rate, $0<\tau\leq 1$ is the acceleration parameter, and T is the symbol duration. The transmitted signal s(t) of the FTN system shown in FIG. 1 can be written in the form $$s(t) = \sum_{n=1}^{N} a_n p(t - n\tau T), \quad 0 < \tau < 1, \tag{1}$$

where N is the total number of transmit data symbols, $a_n$, n=1, ..., N, is the independent and identically distributed data symbols drawn from the M-QAM modulation constellation, $E_s$ is the data symbol energy, p(t) is a unit-energy pulse, i.e. $\int_{-\infty}^{\infty}|p(t)|^2 dt=1$.

The received FTN signal, in case of additive white Gaussian noise (AWGN) channel, is written as $$y(t) = s(t) + n(t), \tag{2}$$

where n(t) is a zero mean complex valued Gaussian random variable with variance $\sigma^2$. A possible receiver architecture for FTN signaling is to use a filter matched to p(t). For such an architecture, the received signal after the matched filter can be written as $$\bar{y}(t) = \sum_{n=1}^{N} a_n g(t - n\tau T) + w(t), \tag{3}$$

where g(t)=p(t)*p(T−t), and w(t)=n(t)*p(T−t). Assuming perfect time synchronization between the transmitter and the receiver, the received FTN signal after the matched filter $\bar{y}(t)$ is sampled every $\tau T$ and the kth received sample is expressed as $$\bar{y}_k = \bar{y}(k\tau T) \tag{3A}$$

$$= \sum_{n=1}^{N} a_n g(k\tau T - n\tau T) + w(k\tau T)$$

$$= \underbrace{a_n g(0)}_{desired\ symbol} + \underbrace{\sum_{n=1, n\neq k}^{N} a_n g((k-n)\tau T) + w(k\tau T)}_{ISI}.$$

Equation (3A) shows that, for a given kth received symbol, there are components from the kth transmitted symbol, as well as ISI from adjacent symbols. This can be re-written in vector form as $$y^c = Ga + w^c, \tag{4}$$

where $y^c$ is the complex N×1 vector of received samples, a is the complex N×1 transmitted data symbols vector and G is the N×N intersymbol interference (ISI) matrix, which is a symmetric Toeplitz matrix. To avoid working with complex $$\bar{y}_{2N\times 1} = \tilde{G}_{2N\times 2N}\tilde{a} + \tilde{w}_{2N\times 1}, \tag{4A}$$

$$\begin{bmatrix} \mathcal{R}(y^c) \\ \mathcal{I}(y^c) \end{bmatrix} = \begin{bmatrix} G & 0_{N\times N} \\ 0_{N\times N} & G \end{bmatrix} \begin{bmatrix} \mathcal{R}(a) \\ \mathcal{I}(a) \end{bmatrix} + \begin{bmatrix} \mathcal{R}(w^c) \\ \mathcal{I}(w^c) \end{bmatrix}.$$

As shown in [27], $w^c \sim \mathcal{N}(0,\sigma^2 G)$. This means that the noise samples after the matched filter and sampler are Gaussian distributed with non-diagonal co-variance matrix, and that, accordingly, the elements of the noise vector $\tilde{w}$ after the matched filter are correlated.

Following [5, 35], it can be shown that the ISI matrix G and the matrix $\tilde{G}$ will be positive-definite, and thus, invertible for general pulse shapes. In this case, we could express Eqn. (4A) as $$\tilde{G}^{-1}\bar{y} = \tilde{a} + \tilde{G}^{-1}\tilde{w}, \tag{4B}$$

$$z = \tilde{a} + n,$$

where $z=\tilde{G}^{-1}\bar{y}$ and $n=\tilde{G}^{-1}\tilde{W}$. The FTN signaling detection problem can be seen as a maximization of the probability that the data symbol vector $\tilde{a}$ is sent given the received samples z. By invoking Bayes theorem, an equivalent expression is thus given by $$\hat{a} = \max_{\tilde{a}\in\mathcal{D}} p(z\mid\tilde{a}), \tag{5}$$

In Eqn. (5), $\mathcal{D}$ is the set of discrete levels for both the in-phase and quadrature components of the symbols and the values of this set depend on the modulation type and order. The likelihood probability $p(z|\tilde{a})$ is the probability that needs to be maximized in order for the detection to be optimal. The problem of finding an estimate vector â that maximizes this probability is known as the maximum likelihood sequence estimation (MLSE) problem. The received samples z can be seen as Gaussian random variables with a mean $\tilde{a}$ and covariance matrix $\frac{1}{2}\sigma^2\tilde{G}^{-1}$ [26]. The likelihood probability in (5) to detect the high-order QAM FTN signaling is expressed as [35]:

$$p(z \mid \tilde{a}) = \left(\frac{1}{2\pi\sigma^2}\right)^{\frac{N}{2}} \frac{1}{\sqrt{det\,[\tilde{G}^{-1}]}} e^{-\frac{1}{\sigma^2}(z-\tilde{a})^\top \tilde{G}(z-\tilde{a})}. \qquad (6)$$

The MLSE problem for detecting the FTN signaling in (4) can therefore be formulated as [26]

$$\hat{a} = \arg\min_{\tilde{a} \in \mathcal{D}} (z - \tilde{a})^\top \tilde{G}(z - \tilde{a}). \qquad (7)$$

For high FTN signaling rates, the FTN signaling has spectral zeros [5] and the matrix $\tilde{G}$ could become ill-conditioned. In this case, to avoid the matrix inversion needed to find z as in (4B), the received symbol vector y is passed through an approximate noise whitening filter [5] that can be obtained using spectral factorization. In this case, we re-write (3A) as $$y^c = a * g + w^c, \qquad (8)$$

where * is the convolution operator. Hence, after passing (8) through the approximate whitening filter, we have $$y^{uncoor} = a * v + w^{uncorr}, \qquad (9)$$

where $w^{uncorr}$ is white Gaussian noise with zero mean and variance $\sigma^2$ and v represents the causal ISI such that $v[n]*v[-n]=g$. Eqn. (9) can then be rewritten in a vector form as $$y^{uncorr} = Va + w^{uncorr}, \qquad (10)$$

where V is a Gram Toeplitz matrix, and thus, is positive semi-definite. Using the equivalent real-valued model $$\tilde{y}^{uncorr}_{2N \times 1} = \tilde{V}_{2N \times 2N}\tilde{a} + \tilde{w}^{uncorr}_{2N \times 1}, \begin{bmatrix} \mathcal{R}(y^{uncorr}) \\ \mathcal{I}(y^{uncorr}) \end{bmatrix} = \begin{bmatrix} V & 0_{N \times N} \\ 0_{N \times N} & V \end{bmatrix} = \begin{bmatrix} \mathcal{R}(a) \\ \mathcal{I}(a) \end{bmatrix} + \begin{bmatrix} \mathcal{R}(w^{uncorr}) \\ \mathcal{I}(w^{uncorr}) \end{bmatrix}, \qquad (10A)$$

and similar to the earlier discussion, the high-order QAM FTN signaling detection problem can be formulated as $$\hat{a} = \arg\min_{\tilde{a} \in \mathcal{D}} \|\tilde{y}^{uncorr}_{2N \times 1} - \tilde{V}_{2N \times 2N}\tilde{a}\|_2^2. \qquad (11)$$

Both FTN signaling detection problems in (7) and (11) are known to be NP hard problems, so there is no known exact algorithm that is guaranteed to obtain the optimal solution in polynomial time in N. Specifically, the computational time required to optimally detect the received FTN signaling sequence in an AWGN channel is expected to grow exponentially with respect to the received sequence block length. This is because of the non-convex feasible set of solutions $\mathcal{D}$ resulting from the discrete constellation lattice of the M-QAM modulation. To address this, we use an optimization algorithm that exploits the positive semi-definite structures of G and $V^TV$ to strike a balance between the computational complexity required for FTN signaling detection and the usefulness of a sub-optimal solution (i.e. the performance). The resulting method is a variant of the ADMM, modified to return good quality sub-optimal solutions for non-convex quadratic programs at low computational cost. For greater clarity, detailed below is an explanation of the concept of operation for the ADMM. Also detailed below is a summary of the ADMM variant that is used for one aspect of the present invention.

It should be clear that, in any communication system, including FTN signaling, detection is done in real time as the symbols are received in blocks of length N. The computational power needed for the detection affects the complexity and latency, and therefore, the cost of the receiver. Accordingly, methods to find the global solution for the optimization problems in (7) or (11), if available, are not favorable because their lengthy run-times cannot be tolerated. Because of this, an optimization scheme that is simple, but powerful and computationally efficient is desirable. Detailed below is a routine to quickly find approximate solutions to (7) and (11).

To explain the process, it should be noted that the optimization algorithm is founded on two main concepts (Augmented Lagrangian methods [31] and the Method of Multipliers [30]) from the field of convex optimization

Augmented Lagrangian and the Method of Multipliers

Augmented Lagrangian methods are developed, in part, to bring robustness to the dual descent method [38], and, in particular, to yield convergence without assumptions such as strict convexity or finiteness. Consider the equality-constrained convex optimization problem $$\min_{x} f(x) \qquad (11A)$$

subject to $Ax = b$, where $x \in \mathbb{R}^n$, $b \in \mathbb{R}^n$, $A \in \mathbb{R}^{m \times n}$ and $f: \mathbb{R}^n \to \mathbb{R}$ is convex.

The augmented Lagrangian for (11A) is [32]:

$$\mathcal{L}_\rho(x, \lambda) = f(x) + \lambda^\top\left(Ax - b + \frac{\rho}{2}\|Ax - b\|_2^2\right), \qquad (12)$$

where $\lambda$ is the vector of Lagrangian multipliers, and $\rho > 0$ is called the penalty parameter. The augmented Lagrangian can be viewed as the (unaugmented) Lagrangian associated with the problem $$\min_{x}\left(f(x) + \frac{\rho}{2}\|Ax - b\|_2^2\right) \qquad (12A)$$

subject to $Ax = b$, which is equivalent to the problem in (11A) since, for any feasible x, the term added to the objective is zero. The associated dual function is $$g_\rho(\lambda) = \min_{x}(\mathcal{L}(x, \lambda)).$$

The advantage of including the penalty term is that $g_\rho$ can be shown to be differentiable under rather mild conditions on the original problem. The gradient of the augmented dual function is found by minimizing over x, and then evaluating the resulting equality constraint residual. Applying the dual ascent to the modified problem yields the algorithm $$x^{k+1} := \arg\min_x \mathcal{L}_\rho(x, \lambda^k) \qquad (13)$$

$$\lambda^{k+1} := \lambda^k + \rho(Ax^{k+1} - b), \qquad (14)$$

which is the method of multipliers. The method of multipliers converges under far more general conditions than dual ascent, including cases when f takes on the value +∞ or is not strictly convex. By using ρ as the step size in the dual update, the iterate $(x^{k+1}, \lambda^{k+1})$ is dual feasible. As the method of multipliers proceeds, the primal residual $Ax^{k+1}-b$ converges to zero, yielding optimality.

On the subject of ADMM, it should be clear that ADMM is a procedure that coordinates decomposition where the solutions to small local sub-problems are coordinated to find a solution to a large global problem. It can be viewed as an attempt to combine the benefit of dual decomposition and augmented Lagrangian methods for constrained optimization. It is an algorithm that is intended to blend the decomposability of dual ascent with the superior convergence properties of the method of multipliers. The algorithm solves problems in the form $$\min_{x_1, x_2} f_1(x_1) + f_2(x_2) \qquad (14A)$$

$$\text{subject to: } A_1 x_1 + A_2 x_2 = b,$$

where $x_1 \in \mathbb{R}^{n_1}$, $x_2 \in \mathbb{R}^{n_2}$, $A_1 \in \mathbb{R}^{p \times n_1}$, $A_1 \in \mathbb{R}^{p \times n_2}$ and $b \in \mathbb{R}^p$. The only difference from the general linear equality-constrained problem of (11A) is that the vector x here has been split into two parts called $x_1$ and $x_2$, with the objective function separable across this splitting. The augmented Lagrangian is formed as $$\mathcal{L}_\rho(x_1, x_2, \lambda) = \qquad (15)$$
$$f_1(x_1) + f_2(x_2) + \lambda^\top(A_1 x_1 + A_2 x_2 - b) + \frac{\rho}{2}\|A_1 x_1 + A_2 x_2 - b\|_2^2.$$

The ADMM consists of the iterations $$x_1^{k+1} := \arg\min_{x_1} \mathcal{L}_\rho(x_1, x_2^k, \lambda^k), \qquad (16)$$

$$x_2^{k+1} := \arg\min_{x_2} \mathcal{L}_\rho(x_1^{k+1}, x_2, \lambda^k), \qquad (17)$$

$$\lambda^{k+1} := \lambda^k + \rho(A_1 x_1^{k+1} + A_2 x_2^{k+1} - b), \qquad (18)$$

where ρ>0. As in the method of multipliers, the dual variable update uses a step size equal to the augmented Lagrangian parameter ρ. While in the method of multipliers the augmented Lagrangian is minimized jointly with respect to the two primal vectors, in ADMM, on the other hand, $x_1$ and $x_2$ are updated in an alternating or sequential fashion, which accounts for the term alternating direction.

ADMM can be written in a slightly different form, which is often more convenient, by combining the linear and quadratic terms in the augmented Lagrangian and scaling the dual variable. By defining the residual $\gamma = A_1 x_1 + A_2 x_2 - b$, we have $$\lambda^\top \gamma + \frac{\rho}{2}\|\gamma\|_2^2 = \frac{\rho}{2}\left\|\gamma + \frac{1}{\rho}\lambda\right\|_2^2 - \frac{1}{2\rho}\|\gamma\|_2^2, \qquad (19)$$
$$= \frac{\rho}{2}\|\gamma + \mu\|_2^2 - \left(\frac{\rho}{2}\right)\|\mu\|_2^2,$$

where $\mu = 1/\rho \lambda$ is the scaled dual variable vector. Using the scaled dual variable vector, we can express ADMM as $$x_1^{k+1} := \arg\min_{x_1}\left(f(x_1) + \frac{\rho}{2}\|A_1 x_1 + A_2 x_2^k - b + \mu^k\|_2^2\right), \qquad (20)$$

$$x_2^{k+1} := \arg\min_{x_2}\left(g(x_2) + \frac{\rho}{2}\|A_1 x_1^{k+1} + A_2 x_2 - b + \mu^k\|_2^2\right), \qquad (21)$$

$$\mu^{k+1} := \mu^k + A_1 x_1^{k+1} + A_2 x_2^{k+1} - b. \qquad (22)$$

ADMM can also be exploited for nonconvex problems such as (7). In such a case, ADMM need not converge, and when it does converge, it need not converge to an optimal point. When it does converge, it can be considered just another local optimization method. For nonconvex problems, ADMM can converge to different (and, in particular, nonoptimal) points, depending on the initial values $x^0$ and $\mu^0$ and the parameter ρ. In the discussion below, ADMM is used for solving the non-convex FTN signaling detection problem in (7).

The problem in (7) can be re-written as $$\hat{a} = \arg\left(\min_{\tilde{a} \in D} \tilde{a}^\top \tilde{G}\tilde{a} + q^\top \tilde{a} + r\right), \qquad (23)$$

where $q^T = -2z^T\tilde{G}$ and $r = z^T\tilde{G}z$. Similarly, the optimization problem in (11) can be re-written as $$\hat{a} = \arg\left(\min_{\tilde{a} \in D} \tilde{a}^\top H\tilde{a} + q_{uncorr}^\top \tilde{a} + r_{uncorr}\right), \qquad (24)$$

where $H = \tilde{V}^T\tilde{V}$ is a positive semi-definite matrix, $q_{uncorr}^T = -2(\tilde{y}_{2N \times 1}^{uncorr})^T H$, and $r_{uncorr} = (\tilde{y}_{2N \times 1}^{uncorr})^T \tilde{y}_{2N \times 1}^{uncorr}$.

For this type of optimization problem, there are many proposed sub-optimal techniques, one of the recent ones is that proposed by R. Takapoui et al. in [42]. This technique is meant to solve non-convex quadratic optimization problems where the objective function is convex, if the discrete requirements on the decision variables are dropped. It is based on a variant of the ADMM algorithm described earlier. Because (23) and (24) fall under the non-convex optimization problems class, the ADMM variant for the FTN signaling detection non-convex problem is not guaranteed to find the global solution. Even though ADMM was originally introduced as a tool for convex optimization problems [32], it turns out to be a powerful heuristic method even for NP-hard nonconvex problems.

In order to use the ADMM, the problem (23) can be rewritten, after adding the auxiliary vector $x \in \mathbb{R}^{2N \times 1}$, as $$\min \tilde{a}^\top \tilde{G} \tilde{a} + q^\top \tilde{a} + r + I_\mathcal{D}(x) \quad (24A)$$

$$\text{subject to } \tilde{a} - x = 0_{2N \times 1},$$

where $I_\mathcal{D}(x)$ denotes the penalty function of $\mathcal{D}$, such that $I_\mathcal{D}(x) = 0$ for $\tilde{a} \in \mathcal{D}$ and $I_\mathcal{D}(x) = \infty$ for $\tilde{a} \notin \mathcal{D}$. Each iteration in the algorithm consists of the following three steps $$\tilde{a}^{k+1} := \arg\min_{\tilde{a}} \left( f(\tilde{a}) = \tilde{a}^\top \tilde{G} \tilde{a} + q^\top \tilde{a} + r + \frac{\rho}{2} \|\tilde{a} - x^k + \mu^k\|_2^2 \right), \quad (25)$$

$$x^{k+1} := \Xi(\tilde{a}^{k+1} + \mu^k), \quad (26)$$

$$\mu^{k+1} := \mu^k + \tilde{a}^{k+1} - x^{k+1}. \quad (27)$$

Here, $\Xi(\cap)$ represents a projection on the set $\mathcal{D}$, the vector $\mu \in \mathbb{R}^{2N}$ is the vector of multipliers and $\rho \in \mathbb{R}$ is a scalar. The projection $\Xi(x) \in$ $$\arg\min_{\tilde{a} \in D} \|\tilde{a} - x\|_2,$$

$\forall x \in \mathbb{R}^{2N}$. Since $\mathcal{D}$ is the cartesian product of subset of the real line, i.e., $\mathcal{D} = \mathcal{D}_1 \times \ldots \times \mathcal{D}_{2N}$ (in our detection problem these are discrete levels), then we can consider $\Xi(x) = (\Xi_1(x_1), \ldots, \mu_{2N}(x_{2N}))$, where $\Xi_i$ is a projection function on to $\mathcal{D}_i$. Since $\mathcal{D}_i$ is a set of discrete values (integers for QAM), $\Xi_i$ rounds its argument to the nearest feasible discrete level. For any finite set $\mathcal{D}_i$ with m elements, $\Xi_i(x_i)$ is the closest point to $x_i$ that belongs to $\mathcal{D}_i$ which can be found by $\lceil \log_2 m \rceil$ comparisons [42]. For a given modulation scheme, m would be the larger number of discrete levels of either the in-phase or the quadrature components. For a QAM modulation with a square constellation and order M, $m = \sqrt{M}$.

The most computationally expensive step is the first step in (25), which involves minimizing an unconstrained strongly convex multivariate quadratic function. For such a problem, it is well known, from mathematical optimization fundamentals, that a local minimizer is also a unique global minimizer. This unique global minimizer necessarily has $\nabla f(\tilde{a}) = 0$, where $\nabla$ is the gradient operator. Given that this is a quadratic multivariate function, the gradient would result in a set of linear equations that has a a unique solution. It is easy to show that the linear system that results is $$[\tilde{G} + \rho I_{2N \times 2N}] \tilde{a}^{k+1} = c, \quad (28)$$

where $c = -q + \rho(x^k - \mu^k)$. The initialization of $\tilde{a}^0$ is simply done by choosing a random point in the convex hull relaxation, $Co\mathcal{D}$, of the discrete lattice. It has been found that running the algorithm more than once with different random initializations increases the chance of finding $\tilde{a} \in \mathcal{D}$ with better quality solutions, and, accordingly, leads to better performance. The initial value of the multiplier vector $\mu^0$ is set to 0. Moreover, as discussed in [42], theoretical analysis and practical evidence suggest that the precision and convergence rate of first-order methods can be significantly improved by preconditioning the problem. The preconditioning used in our detector simply divides $\tilde{G}$ and q by the maximum singular value of $\tilde{G}$. Finally it is worth mentioning that since the objective value need not decrease monotonically, it is critical to keep track of the best point found. The ADMMSE FTN detection algorithm is summarized in pseudo-code in FIG. 2. For the algorithm summarized in FIG. 2, the input matrix may be the ISI matrix or a causal ISI matrix.

Regarding the complexity of ADMMSE, the most computationally expensive step in the ADMMSE is that required to solve the linear system in (28). This can be solved at a worst case complexity of $\mathcal{O}(4N^2)$ when the coefficient matrix is factorized using $LDL^T$ factorization [42]. The factorization process requires $\mathcal{O}(8N^3)$ [42], however it is performed only once, for AWGN channels, before any detection takes place and its result is cached and used through the detection process for every group of N symbols. Therefore, when this gets penalized over a very large number of received blocks of N symbols, its effect becomes negligible. Finally, the step (27) is simply an update step the involves just 4N additions and subtractions. If the maximum number of iterations is L and the number of initializations is $\kappa$, the overall algorithm complexity is $\mathcal{O}(4L\kappa N^2 b_1 + 2NL\kappa \lceil \log_2 m \rceil b_2 + 4NL\kappa b_3)$, where $b_1$, $b_2$ and $b_3$ are the computational times, in seconds, for each of (20-22), respectively, when N=1.

In order to generate soft-outputs for channel coding, the ADMMSE can be effectively used to reduce the complexity of evaluating the log-likelihood ratio (LLR). Using the idea of the list sphere decoding in [1], the ADMMSE can store a list of vectors returned after L iterations for each of the $\kappa$ initial points. The list of vectors returned are the $\kappa$ vectors with the lowest objective function for either (7) or (11). This is done instead of storing only one vector that achieves the smallest objective value that the ADMMSE finds after $\kappa$L iterations. This candidate list can then be used to approximate the LLR calculations as in the list sphere decoding in [1]. Hence, instead of searching the whole search space, ADMMSE efficiently produces candidate vectors that contribute the most towards the calculation of the LLR values.

Regarding performance of the inventive method detailed above, simulation results show that the ADMMSE detector according to the present invention can outperform GAS-DRSE for 16-QAM and quadrature phase shift keying (QPSK) while requiring less than 25% of the computational time. Moreover, the SE gains of the ADMMSE detector are up to 44.7% higher than the GASDRSE detector for 16-QAM FTN signaling. More importantly, the ADMMSE FTN signaling detector according to the present invention succeeds in achieving a SE gain that ranges from 7.5% up to 58% for 64K (65536)-QAM when compared to Nyquist signaling. Research suggests that achieving high modulation orders for FTN signaling detection with practical low computational effort while achieving promising SE gains with respect to its corresponding Nyquist signalling is unprecedented. Additionally, for binary phase shift keying (BPSK) and QPSK, the ADMMSE FTN signaling detector according to the present invention significantly outperforms the successive symbol-by-symbol sequence estimation (SSSSE) and successive symbol-by-symbol with go-back-K sequence estimation (SSSgbKSE) algorithms in [28] at the expense of higher computational time.

The various aspects of the present invention may be used in any number of applications or implementations. As examples, the estimation method may be used in high-speed point-to-point microwave links such that use QAM modulation orders up to 4096. Similarly, the present invention may be used in digital video broadcasting technology DVB- C2 that use QAM modulation orders up to 4096. And, finally, the present invention may be used with the broadband cable-based Internet DOCSIS 3.1 standard that uses QAM modulation orders of up to 16,384 (16K).

From the above, one aspect of the present invention involves a method for estimating the data symbols encoded in a received signal received from a transmission system. These data symbols are encoded in a signal that has been transmitted at faster than Nyquist rates. The method involves receiving an input matrix and a received samples vector (containing samples from the received signal). The input matrix (which may be an ISI matrix or the causal ISI matrix) and the received samples vector are then preconditioned. The preconditioned input matrix is then factorized. An estimated vector for the sequence of encoded data symbols is then calculated based on the preconditioned and factorized input matrix, the preconditioned received samples vector, a current estimate vector, a current multipliers vector, and a current auxiliary vector. The next auxiliary vector is then calculated using the estimated vector of data symbols and the current multipliers vector. The next multipliers vector is then calculated using the estimated vector and the next auxiliary vector, and the current multipliers vector. An assessment of the current function value using the current estimate vector is then made, along with an assessment of the function value using a best estimate vector. If the result of the assessment shows that the current function value using the current estimate vector indicates a minimum (i.e., the function value using the best estimate vector is greater than the current function value using the current estimate vector), then the current estimate vector is stored as the best estimate vector. Once this assessment-comparison step has been completed, a calculation loop that includes the calculation steps for the estimated vector, the next auxiliary vector, and the next multipliers vector and the assessment-comparison step are iterated for a predetermined number of times. Another loop that includes the initialization of the various vectors (not including the best estimate vector) and the calculation loop is then also iterated for a predetermined number of times. This means that, for each initialization step, the calculation loop is executed n times and the loop that includes the initialization step is executed m times. The calculation loop is thus executed n×m times and the result of the nested loops is the best estimate vector for the encoded data symbols in the received signal. It should also be clear that n and m, depending on the implementation, may be variable (e.g., user entered or table based) values or may be hardwired into the system.

It should be clear that the various aspects of the present invention may be implemented using various means. As an example, an ASIC (application specific integrated circuit) that is properly configured may be used to implement the method for estimating the data symbols in the received signal. Alternatively, the method of the present invention may be practiced by using a data processor (e.g., a CPU with suitably configured memory) in conjunction with either volatile or non-volatile memory that contains computer executable code that implements the method outlined above.

The present invention thus involves a novel FTN signaling detection method that exploits a variant of the ADMM algorithm from the field of convex optimization. The present invention's various aspects may be used to detect ultra high-order QAM FTN signaling. The various implementations of such a detector achieves excellent performance at a very low complexity, enabling it to obtain excellent SE gains for ultra high-order QAM modulation orders reaching up to 65,536 while being suitable for practical implementation in terms of computational overhead. Experiments have shown that the various aspects of the present invention has demonstrated superiority in QPSK FTN signaling detection over the GASDRSE, the SSSSE and the SSSgbKSE in terms of BER at high ISI (i.e., higher spectral efficiency). In addition, the various aspects of the present invention has also demonstrated a much lower computational effort, measured in CPU time, when compared to GASDRSE. In comparison to GASDRSE for 16-QAM FTN signaling, the various aspects of the present invention returns a slightly better performance at a much lower computational effort by 700%, when $\tau \in \{0.8, 0.7\}$ and $\alpha \in \{0.5, 0.3\}$. The SE of the present invention, when compared to GASDRSE, was evaluated for rRC roll-off factors in the range 0 to 1 in 16-QAM FTN signaling showing the superiority of present invention at all roll-off factors, especially at moderate to high values.

As noted above, for a better understanding of the present invention, the following references may be consulted. Each of these references is hereby incorporated in their entirety by reference.

[1] B. M. Hochwald and S. ten Brink, "Achieving near-capacity on a multiple-antenna channel," *IEEE Transactions on Communications*, vol. 51, no. 3, pp. 389-399, March 2003.

[2] Cheng-Kun Wang and Lin-Shan Lee, "Practically realizable digital transmission significantly below the Nyquist bandwidth," *IEEE Transactions on Communications*, vol. 43, no. 2/3/4, pp. 166-169, February/March/April 1995.

[3] L. Onural, A. Gotchev, H. M. Ozaktas, and E. Stoykova, "A survey of signal processing problems and tools in holographic three-dimensional television," *IEEE Transactions on Circuits and Systems for Video Technology*, vol. 17, no. 11, pp. 1631-1646, October 2007.

[4] F. Rusek and J. B. Anderson, "Non binary and precoded faster than Nyquist signaling," *IEEE Transactions on Communications*, vol. 56, no. 5, pp. 808-817, May 2008.

[5] A. Prlja, J. B. Anderson, and F. Rusek, "Receivers for faster-than-Nyquist signaling with and without turbo equalization," in *Proceedings of the IEEE International Symposium on Information Theory*, 2008, pp. 464-468.

[6] F. Rusek, "On the existence of the Mazo-limit on MIMO channels," *IEEE Transactions on Wireless Communications*, vol. 8, no. 3, pp. 1118-1121, March 2009.

[7] F. Rusek and J. B. Anderson, "Multistream faster than Nyquist signaling," *IEEE Transactions on Communications*, vol. 57, no. 5, pp. 1329-1340, May 2009.

[8] J. B. Anderson, A. Prlja, and F. Rusek, "New reduced state space BCJR algorithms for the ISI channel," in *Proceedings of the IEEE International Symposium on Information Theory*, 2009, pp. 889-893.

[9] A. Barbieri, D. Fertonani, and G. Colavolpe, "Time-frequency packing for linear modulations: spectral efficiency and practical detection schemes," *IEEE Transactions on Communications*, vol. 57, no. 10, pp. 2951-2959, October 2009.

[10] P. Hasse, D. Jaeger, and J. Robert, "DVB-C2—" a standard for improved robustness in cable networks," in *Proceedings of the IEEE International Symposium on Consumer Electronics (ISCE 2010)*, 2010, pp. 1-6.

[11] A. Prlja and J. B. Anderson, "Reduced-complexity receivers for strongly narrowband intersymbol interference introduced by faster-than-Nyquist signaling," *IEEE Transactions on Communications*, vol. 60, no. 9, pp. 2591-2601, September 2012.

[12] S. Sugiura, "Frequency-domain equalization of faster-than-Nyquist signaling," *IEEE Wireless Communications Letters*, vol. 2, no. 5, pp. 555-558, October 2013.

[13] T. Ishihara and S. Sugiura, "Frequency-domain equalization aided iterative detection of faster-than-Nyquist signaling with noise whitening," in *Proceedings of the IEEE International Conference on Communications (ICC)*, 2016, pp. 1-6.

[14] J. Fan, Y. Ren, Y. Zhang, and X. Luo, "Iterative carrier frequency offset estimation for faster-than-Nyquist signaling," in *Proceedings of the IEEE International Symposium on Wireless Personal Multimedia Communications (WPMC)*, 2017, pp. 150-153.

[15] C. Han and Y. Chen, "Propagation modeling for wireless communications in the terahertz band," *IEEE Communications Magazine*, vol. 56, no. 6, pp. 96-101, June 2018.

[16] I. F. Akyildiz, C. Han, and S. Nie, "Combating the distance problem in the millimeter wave and terahertz frequency bands," *IEEE Communications Magazine*, vol. 56, no. 6, pp. 102-108, June 2018.

[17] A. Rashich and S. Gorbunov, "ZF equalizer and trellis demodulator receiver for SEFDM in fading channels," in *Proceedings of the International Conference on Telecommunications (ICT)*, 2019, pp. 300-303.

[18] B. Berscheid and C. Howlett, "Full duplex DOCSIS: Opportunities and challenges," *IEEE Communications Magazine*, vol. 57, no. 8, pp. 28-33, August 2019.

[19] P. Song, F. Gong, and Q. Li, "Blind symbol packing ratio estimation for faster-than-Nyquist signalling based on deep learning," *Electronics Letters*, vol. 55, no. 21, pp. 1155-1157, October 2019.

[20] A. Clemm, M. T. Vega, H. K. Ravuri, T. Wauters, and F. D. Turck, "Toward truly immersive holographic-type communication: Challenges and solutions," *IEEE Communications Magazine*, vol. 58, no. 1, pp. 93-99, January 2020.

[21] W. Yuan, N. Wu, Q. Guo, D. W. K. Ng, J. Yuan, and L. Hanzo, "Iterative joint channel estimation, user activity tracking, and data detection for FTN-NOMA systems supporting random access," *IEEE Transactions on Communications*, vol. 68, no. 5, pp. 2963-2977, May 2020.

[22] A. Caglan, A. Cicek, E. Cavus, E. Bedeer, and H. Yanikomeroglu, "Polar coded faster-than-Nyquist (FTN) signaling with symbol-by-symbol detection," in *Proceedings of the IEEE Wireless Communications and Networking Conference (WCNC)*, 2020, pp. 1-5.

[23] Q. Li, F. Gong, P. Song, G. Li, and S. Zhai, "Joint channel estimation and precoding for faster-than-Nyquist signaling," *IEEE Transactions on Vehicular Technology*, pp. 1-1, September 2020.

[24] RACOM. Racom products: Ray-microwave link. Last accessed 10-11-2020. [Online]. Available: https://www.racom.eu/eng/products/microwave-link.html=Opt

[25] J. B. Anderson, F. Rusek, and V. Owall, "Faster-than-Nyquist signaling," *Proceedings of the IEEE*, vol. 101, no. 8, pp. 1817-1830, March 2013.

[26] E. Bedeer, M. H. Ahmed, and H. Yanikomeroglu, "Low-complexity detection of high-order QAM faster-than-Nyquist signaling," *IEEE Access*, vol. 5, pp. 14 579-14 588, 2017.

[27] E. Bedeer, H. Yanikomeroglu, and M. H. Ahmed, "Reduced complexity optimal detection of binary faster-than-Nyquist signaling," in *Proceedings of the IEEE International Conference on Communications (ICC)*, 2017, pp. 1-6.

[28] E. Bedeer, M. H. Ahmed, and H. Yanikomeroglu, "A very low complexity successive symbol-by-symbol sequence estimator for faster-than-Nyquist signaling," *IEEE Access*, vol. 5, pp. 7414-7422, 2017.

[29] E. Bedeer, H. Yanikomeroglu, and M. H. Ahmed, "Low-complexity detection of M-ary PSK faster-than-Nyquist signaling," in *Proceedings of the IEEE Wireless Communications and Networking Conference Workshop (WCNCW)*, 2019, pp. 1-5.

[30] D. P. Bertsekas, *Constrained Optimization and Lagrange Multiplier Methods*. 1 em plus 0.5 em minus 0.4 em Academic Press, 2014.

[31] E. G. Birgin and J. M. Martinez, *Practical Augmented Lagrangian Methods for Constrained Optimization*. SIAM, 2014.

[32] S. Boyd, N. Parikh, E. Chu, B. Peleato, and J. Eckstein, "Distributed optimization and statistical learning via the alternating direction method of multipliers," *Foundations and Trends in Machine Learning*, vol. 3, no. 1, pp. 1-122, 2011.

[33] ITU-R, "Minimum requirements related to technical performance for IMT-2020 radio interface(s)," November 2017.

[34] ITU-T, "Focus group on technologies for network 2030: Representative use cases and key network requirements," February 2020.

[35] D. H. Johnson, "Statistical signal processing," *Lecture Notes*, 2013, last accessed on 10-11-2020. [Online]. Available: http://cnx.org/content/col11382/1.1/.Lecturenotes

[36] M. Kulhandjian, E. Bedeer, H. Kulhandjian, C. D'Amours, and H. Yanikomeroglu, "Low-complexity detection for faster-than-Nyquist signaling based on probabilistic data association," *IEEE Communications Letters*, vol. 24, no. 4, pp. 762-766, April 2020.

[37] A. D. Liveris and C. N. Georghiades, "Exploiting faster-than-Nyquist signaling," *IEEE Transactions on Communications*, vol. 51, no. 9, pp. 1502-1511, September 2003.

[38] Z.-Q. Luo and P. Tseng, "On the convergence rate of dual ascent methods for linearly constrained convex minimization," *Mathematics of Operations Research*, vol. 18, no. 4, pp. 846-867, November 1993.

[39] J. E. Mazo, "Faster-than-nyquist signaling," *The Bell System Technical Journal*, vol. 54, no. 8, pp. 1451-1462, October 1975.

[40] H. Nyquist, "Certain topics in telegraph transmission theory," *Transactions of the American Institute of Electrical Engineers*, vol. 47, no. 2, pp. 617-644, April 1928.

[41] F. Rusek and J. B. Anderson, "The two dimensional Mazo limit," in *Proceedings of the International Symposium on Information Theory (ISIT)*, 2005, pp. 970-974.

[42] R. Takapoui, N. Moehle, S. Boyd, and A. Bemporad, "A simple effective heuristic for embedded mixed-integer quadratic programming," *International Journal of Control*, vol. 93, no. 1, pp. 2-12, April 2017.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A data processor block for use in a data receiver system, the data processor block comprising:
   a data processor for processing a received signal, said received signal being received by said data receiver system, said data processor being for estimating a sequence of data symbols in said received signal, said symbols having been transmitted at a rate faster than a Nyquist rate;
   wherein said data processor implements a method comprising:
   a) receiving an input matrix, a received samples vector, received samples in said received samples vector being from said received signal;
   b) preconditioning said input matrix and said received samples vector to result in a prepared input matrix and a prepared received samples vector;
   c) performing a factorization of prepared input matrix;
   d) initializing a best estimate vector;
   e) initializing a current estimate vector, a current multipliers vector, and a current auxiliary vector;
   f) executing steps (f1)-(f4);
   g) repeating step f) for a predetermined number of iterations;
   h) repeating steps (e)-(g) for a predetermined number of initializations;
   i) outputting said best estimate vector as said estimate for said sequence of data symbols;
   wherein steps (f1)-(f4) comprises:
   f1) calculating a next estimate vector for said sequence of data symbols based on said prepared input matrix, said prepared received samples vector, a current estimate vector, a current multipliers vector, and a current auxiliary vector,
   f2) calculating a next auxiliary vector based on said next estimate vector and said current multipliers vector;
   f3) calculating a next multipliers vector based on said current multipliers vector, said next estimate vector, and said next auxiliary vector;
   f4) assessing a calculated current function value using said current estimate vector and comparing said calculated current function value with a result of assessing a best estimate function value and, if said calculated current function value is less than said result of assessing said best estimate function value, storing said current estimate vector as said best estimate vector.

2. The data processor block according to claim 1 wherein the method further comprises receiving a value for said predetermined number of iterations.

3. The data processor block according to claim 1 wherein said predetermined number of iterations is a fixed number.

4. The data processor block according to claim 1 wherein the method further comprises receiving a value for said predetermined number of initializations.

5. The data processor block according to claim 1 wherein said predetermined number of initializations is a fixed number.

6. The data processor block according to claim 1 wherein step (f1) comprises calculating $$\tilde{a}^{k+1} := \arg\min_{\tilde{a}}\left(f(\tilde{a}) = \tilde{a}^\top \tilde{G}\tilde{a} + q^\top \tilde{a} + r + \frac{\rho}{2}\|\tilde{a} - x^k + \mu^k\|_2^2\right),$$

wherein $\tilde{a}$ is said estimate vector, q is said prepared received samples vector, $\tilde{G}$ is said prepared input matrix, $x^k$ is said current auxiliary vector, $\mu^k$ is said current multipliers vector, $\tilde{a}^{k+1}$ is said next estimate vector, and $\rho$ is a scalar.

7. The data processor block according to claim 1 wherein step (f2) comprises calculating $$x^{k+1} := \Xi(\tilde{a}^{k+1} + \mu^k),$$

wherein $\mu^k$ is said current multipliers vector, $\tilde{a}^{k+1}$ is said next estimate vector,
$x^{k+1}$ is said next auxiliary vector, and wherein, for any finite set $\mathcal{D}_i$ with m elements, $\Xi_i(x_i)$ is a closest point to $x_i$ that belongs to $\mathcal{D}_i$ which can be found by $\lceil \log_2 m \rceil$ comparisons.

8. The data processor block according to claim 1 wherein step f3) comprises calculating $$\mu^{k+1} := \mu^k + \tilde{a}^{k+1} - x^{k+1},$$

wherein $\mu^{k+1}$ is said next multipliers vector, $\mu^k$ is said current multipliers vector, $\tilde{a}^{k+1}$ is said next estimate vector, and $x^{k+1}$ is said next auxiliary vector.

9. The data processor block according to claim 1 wherein step f1) comprises calculating $$\tilde{a}^{k+1} := \arg\min_{\tilde{a}}\left(f(\tilde{a}) = \tilde{a}^\top \tilde{G}\tilde{a} + q^\top \tilde{a} + r + \frac{\rho}{2}\|\tilde{a} - x^k + \mu^k\|_2^2\right);$$

step f2) comprises calculating $$x^{k+1} := \Xi(\tilde{a}^{k+1} + \mu^k);$$

step f3) comprises calculating $$\mu^{k+1} := \mu^k + \tilde{a}^{k+1} - x^{k+1};$$

wherein $\mu^k$ is said current multipliers vector, $\tilde{a}^{k+1}$ is said next estimate vector, $x^{k+1}$ is said next auxiliary vector, $\mu^{k+1}$ is said next multipliers vector, $x^{k+1}$ is said next auxiliary vector, $\tilde{a}$ is said estimate vector, q is said prepared received samples vector, $\tilde{G}$ is said prepared input matrix, $x^k$ is said current auxiliary vector, $\rho$ is a scalar and wherein, for any finite set $\mathcal{D}_i$ with m elements, $\Xi_i(x_i)$ is a closest point to $x_i$ that belongs to $\mathcal{D}_i$ which can be found by $\lceil \log_2 m \rceil$ comparisons.

10. The data processor block according to claim 1 wherein step (b) comprises dividing all elements in both of said input matrix and said received samples vector by a largest singular value in said input matrix.

11. The data processor block according to claim 1 wherein said input matrix is an intersymbol interference (ISI) matrix or said input matrix is a causal ISI matrix.

12. The data processor block according to claim 1 wherein step e) comprises selecting random values for said current estimate vectors, said random values being possible values for said sequence of data symbols.

13. The data processor block according to claim 1 wherein step f4) comprises assessing said estimated result to determine if estimate result indicates a minimum as compared to a best estimate and, if said estimated result indicates said minimum, then replacing said best estimate vector with said estimated result vector.

14. A method for estimating a sequence of data symbols in a received signal, the method comprising:
  a) receiving said received signal;
  b) receiving an input matrix and a received samples vector, received samples in said received samples vector being from said received signal;
  c) preconditioning said input matrix and said received samples vector to result in a prepared input matrix and a prepared received samples vector;
  d) performing a factorization of prepared input matrix;
  e) initializing a best estimate vector;
  f) initializing a current estimate vector, a current multipliers vector, and a current auxiliary vector;
  g) executing steps g1)-g4);
  h) repeating step g) for a predetermined number of iterations;
  i) repeating steps g)-h) a predetermined number of initializations;
  j) outputting said best estimate vector as said estimate for said sequence of data symbols;
  wherein said symbols having been transmitted at a rate faster than a Nyquist rate; and
  wherein steps g1)-g4) comprises:
    g1) calculating a next estimate vector for said sequence of data symbols based on said prepared input matrix, said prepared received samples vector (q), a current estimate vector, a current multipliers vector, and a current auxiliary vector;
    g2) calculating a next auxiliary vector based on said next estimate vector and said current multipliers vector;
    g3) calculating a next multipliers vector based on said current multipliers vector, said next estimate vector, and said next auxiliary vector;
    g4) assessing an estimated result to determine if said estimate result indicates a minimum as compared to an assessment of said best estimate vector and, if said estimated result indicates said minimum, then replacing said best estimate vector with said estimated current estimate vector.

15. The method according to claim 14 wherein step g4) comprises assessing a calculated current function value using said current estimate vector and comparing said calculated current function value with a result of assessing a best estimate function value and, if said calculated current function value is less than said result of assessing said best estimate function value, storing said current estimate vector as said best estimate vector.

16. The method according to claim 14 wherein step g1) comprises calculating $$\tilde{a}^{k+1} := \arg\min_{\tilde{a}}\left(f(\tilde{a}) = \tilde{a}^\top \tilde{G}\tilde{a} + q^\top \tilde{a} + r + \frac{\rho}{2}\|\tilde{a} - x^k + \mu^k\|_2^2\right);$$

step g2) comprises calculating $$x^{k+1} := \Xi(\tilde{a}^{k+1} + \mu^k);$$

step g3) comprises calculating $$\mu^{k+1} := \mu^k + \tilde{a}^{k+1} - x^{k+1};$$

wherein $\mu^k$ is said current multipliers vector, $\tilde{a}^{k+1}$ is said next estimate vector, $x^{k+1}$ is said next auxiliary vector, $\mu^{k+1}$ is said next multipliers vector, $x^{k+1}$ is said next auxiliary vector, $\tilde{a}$ is said estimate vector, q is said prepared received samples vector, $\tilde{G}$ is said prepared input matrix, $x^k$ is said current auxiliary vector, $\rho$ is a scalar and wherein, for any finite set $\mathcal{D}_i$ with m elements, $\Xi_i(x_i)$ is a closest point to $x_i$ that belongs to $\mathcal{D}_i$ which can be found by $\lceil \log_2 m \rceil$ comparisons.

17. A data processor block for use in a data receiver system, the data processor block comprising:
  a data processor for estimating a sequence of data symbols in a received signal, said symbols having been transmitted at a rate faster than a Nyquist rate;
  wherein said data processor implements a method comprising:
    a) receiving an input matrix, a received samples vector, received samples in said received samples vector being from said received signal;

b) executing steps (b1)-(b4);
c) repeating step b) for a predetermined number of iterations;
d) outputting a best estimate vector from iterations of steps (b1)-(b4) as said estimate for said sequence of data symbols;
wherein steps (b1)-(b4) comprises:
- b1) calculating a next estimate vector for said sequence of data symbols based on said input matrix, said received samples vector, a current estimate vector, a current multipliers vector, and a current auxiliary vector,
- b2) calculating a next auxiliary vector based on said next estimate vector and said current multipliers vector;
- b3) calculating a next multipliers vector based on said current multipliers vector, said next estimate vector, and said next auxiliary vector;
- b4) assessing a calculated current function value using said current estimate vector and comparing said calculated current function value with a result of assessing a best estimate function value and, if said calculated current function value is less than said result of assessing said best estimate function value, storing said current estimate vector as said best estimate vector.

18. The data processor according to claim 17 wherein said method includes one or more of: a step of preconditioning said input matrix and said received samples vector prior step (b); performing a factorization of said input matrix prior to step b); and performing an initialization step wherein multiple vectors used in said method are initialized.

19. The data processor according to claim 17 wherein steps b) and c) are repeated for a predetermined number of initializations.

20. The data processor according to claim 17 wherein
step b1) comprises calculating $$\tilde{a}^{k+1} := \arg\min_{\tilde{a}}\left(f(\tilde{a}) = \tilde{a}^\top \tilde{G}\tilde{a} + q^\top \tilde{a} + r + \frac{\rho}{2}\|\tilde{a} - x^k + \mu^k\|_2^2\right);$$

step b2) comprises calculating $$x^{k+1} := \Xi(\tilde{a}^{k+1} + \mu^k);$$

step b3) comprises calculating $$x^{k+1} := \Xi(\tilde{a}^{k+1} + \mu^k);$$

wherein $\mu^k$ is said current multipliers vector, $\tilde{a}^{k+1}$ is said next estimate vector, $x^{k+1}$ is said next auxiliary vector, $\mu^{k+1}$ is said next multipliers vector, $x^{k+1}$ is said next auxiliary vector, $\tilde{a}$ is said estimate vector, q is said received samples vector, $\tilde{G}$ is said input matrix, $x^k$ is said current auxiliary vector, $\rho$ is a scalar and wherein, for any finite set $\mathcal{D}_i$ with m elements, $\Xi_i(x_i)$ is a closest point to $x_i$ that belongs to $\mathcal{D}_i$ which can be found by $\lceil \log_2 m \rceil$ comparisons.

* * * * *